Dec. 6, 1966     J. T. KUTNEY     3,289,414
CRUISE FAN POWERPLANT
Filed July 30, 1964
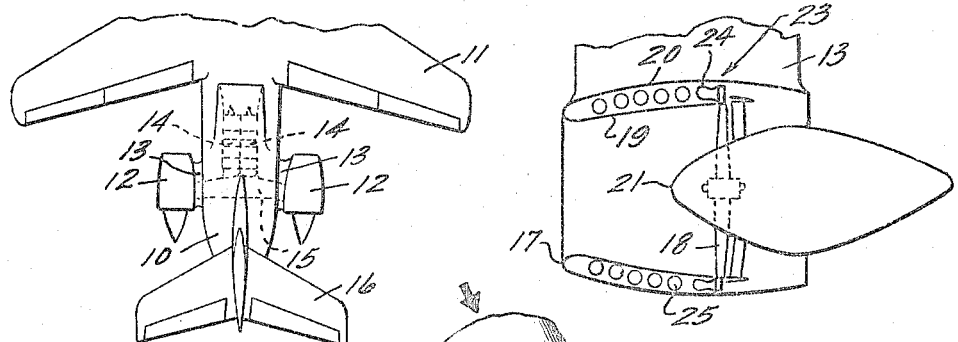
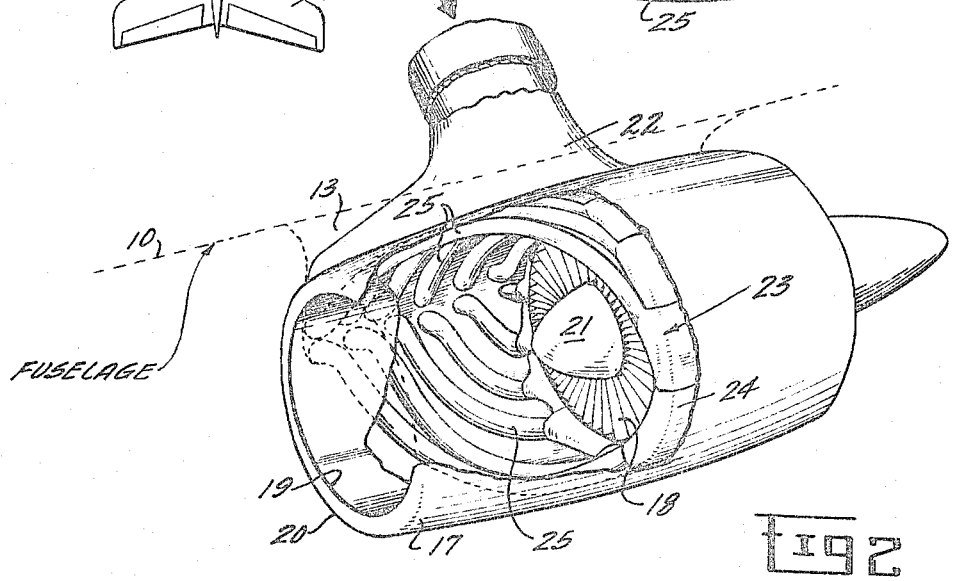
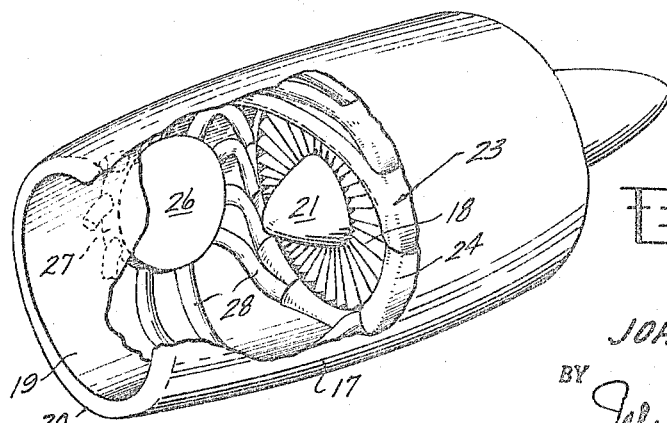
INVENTOR.
JOHN T. KUTNEY
BY
ATTORNEY

United States Patent Office 3,289,414
Patented Dec. 6, 1966

3,289,414
CRUISE FAN POWERPLANT
John T. Kutney, Cincinnati, Ohio, assignor to General Electric Company, a corporation of New York
Filed July 30, 1964, Ser. No. 386,295
8 Claims. (Cl. 60—263)

The present invention is directed to a cruise fan powerplant and, more particularly, to a powerplant employing a tip turbine fan in a thin nacelle and providing means for feeding the periphery of the fan with driving fluid.

In large aircraft it has become customary to consider the cruise fan as an attractive propulsion system because of its desirable operating characteristics such as good thrust capabilities and low specific fuel consumption. A cruise fan may be a tip turbine type employing large fans with tip turbine buckets around the periphery thereof, the whole being mounted in a nacelle and the fan being driven from scroll means feeding the tip turbine buckets. The scroll in turn may receive its exhaust gas driving fluid from remotely placed exhaust gas generators such as jet engines. The advantage of the remotely located gas generators is the ability to direct the flow where desired such as to cruise fans.

For various reasons that are well known such as safety in case of engine failure it is also desirable to use common ducting in certain applications. In such an arrangement the common duct may feed a cruise fan on each side of the fuselage and a central gas generator may feed the common duct. One of the difficulties encountered is that the mass flow of exhaust gas from some gas generators is so much that a very large pipe is required to carry the driving fluid to the cruise fan. This also includes the distribution of the driving fluid around the periphery of the cruise fan by the scroll means that feed the tip turbine buckets. A typical installation on such rotating cruise fan devices is shown in United States Patent 3,033,492 wherein the details of a particular rotatable cruise fan are shown. A more general arrangement is shown in United States Patent 3,038,683. These patents clearly show the relatively large pipe necessary to carry the exhaust gases to the cruise fan. Additionally, once the exhaust gases have been carried to the nacelle structure, as pointed out above, they must be distributed around the periphery of the cruise fan.

Because the pipe necessary to accommodate the mass flow assumes relatively large proportions it can become completely unacceptable from an aerodynamic standpoint by offering to much air resistance and high drag. It is customary to mount the external appendages such as engines by means of airfoil shaped pylons because they offer low resistance. Typically, to be aerodynamically acceptable, it is a general rule that the ratio of the thickness of the pylon to its length or chord should be in the neighborhood of 6% to 10%. Above that, the drag becomes prohibitive. With large gas generators and large mass flows it is impossible to maintain such a ratio within reasonable limits and still use a pipe large enough to carry the mass flow. Maintaining the ratio would then require a pylon so long as to be unacceptable.

It is possible to split the flow from the gas generators into many smaller ducts in place of one large pipe but, in those applications where the cruise fan is to rotate for VTOL or STOL missions, it becomes difficult to provide a coupling arrangement that permits this operation. Applicant's co-pending application, Serial No. 386,294, filed concurrently with this application, now Patent No. 3,212,-733, discloses a coupling arrangement that solves this difficult rotation problem.

Further, it is then desirable to feed the scroll structure about the fan periphery in some suitable manner. Again, large masses of driving fluid have to be handled and attempting to feed the fan scroll from one large pipe would result in a prohibitively thick and aerodynamically unacceptable nacelle structure.

The main object of the present invention is to provide a cruise fan powerplant in which the fluid carrying duct is split into a plurality of smaller ducts that are side-by-side in the nacelle to maintain a thin nacelle.

A further object is to provide such a powerplant wherein each of the plurality of fluid carrying ducts is individually connected to a segment of the peripheral scroll.

Another object is to provide such a powerplant wherein the nacelle structure is maintained relatively thin and the cruise fan is fed by a series of spiralling and symmetrically arranged ducts within the nacelle wall.

Briefly stated, the invention is directed to a cruise fan powerplant that has a barrel-like casing with inner and outer walls to form a hollow elongated nacelle. The nacelle carries a rotatable tip turbine fan for movement of air through the nacelle to produce thrust. Scroll means are disposed about the periphery of the fan, either radially or axially, between the walls and oriented to direct gas to the tip turbine to drive the fan. The scroll is made up of a plurality of segmented sections of discrete degrees of arc and individual ducts are connected to each segment to direct gas to the segment. The ducts are arranged and extend between the nacelle walls in a side-by-side relation to a common plenum that is preferably disposed at the side of the nacelle. The ducts are arranged to spiral symmetrically in opposite directions around the nacelle and between the walls from the common plenum to feed the segments. The common plenum may form a circular chamber at the side of the nacelle or an elongated chamber parallel to the axis of the fan rotation depending on the particular application.

While the specification concludes with claims particularly pointing out and distinctly claiming the subject matter which is regarded as the invention, it is believed the invention will be better understood from the following description taken in connection with the accompanying drawings in which:

FIG. 1 is a partial plan view of an aircraft employing cruise fan powerplants of the conventional type illustrating the application;

FIG. 2 is a partial perspective view broken away and illustrating an elongated plenum chamber application and the spiralling symmetrical arrangement of the ducts;

FIG. 3 is a typical cross-sectional schematic view of a nacelle structure employing the instant invention; and FIG. 4 is a view similar to FIG. 2 showing the generally circular chamber arrangement at the side of the nacelle.

Referring first to FIG. 1, there is shown a general view of a conventional aircraft having a fuselage 10 with the customary wings 11 thereon with all the normal appendages as is well known including the possibility of using lift fans in the wing structure also as is well known. In order to propel the aircraft, it is for descriptive purposes herein, equipped on the fuselage generally at the aft end, with a pair of oppositely disposed cruise fan powerplants 12 that are supported by a suitable structure such as pylon 13 that may serve also as a pipe carrying exhaust gases to cruise fans 12. The driving fluid may be supplied by remote gas generators 14 of one or more jet engines that feed a common duct 15. Finally, the whole aircraft is equipped with a conventional aircraft tail unit 16. The details of such propulsion systems are explained in more detail in the aforementioned patents. Cruise fan 12 may be rotatable by means of the structure disclosed in applicant's co-pending application or may be fixed to pylons 13 if rotation for VTOL or STOL is not desired. The invention herein is directed to the general powerplant structure itself rather than its application.

Because the usual tip turbine cruise fan utilizes all the output of the gas generator it requires a lot of duct work in order to carry the exhaust gas fluid to the scroll directing the driving gases to the tip turbine. Directing all of this exhaust gas fluid through a single pipe structure requires a very large pipe in order to handle the mass of fluid required. In distribution about any substantial periphery of a scroll this would result in an extremely thick nacelle that would be completely unacceptable. In order to maintain the nacelle structure of powerplants 12 within reasonable aerodynamic configurations, it is proposed to use a plurality of smaller individual ducts to feed the scroll. Additionally, it is proposed to split the scroll into segments of discrete degrees of arc and connect the individual ducts to each segment to direct the exhaust gas fluid to the segments.

Referring next to FIG. 2, the details of the invention as applied to one modification are explained. In the description herein it will be understood that nacelle 17 housing fan 18 comprises a cruise fan similar to 12 in FIG. 1. It may be desired that the whole nacelle 17 be rotated so that VTOL or STOL operation may be obtained or it may be fixed for straight cruise operation. In the FIG. 2 modification it will be assumed that no rotation is desired and fixed operation is preferred. In this figure the powerplant comprises a barrel-like casing structure which has inner and outer walls 19 and 20 respectively to form the hollow elongated nacelle 17. In order to obtain thrust, tip turbine fan 18 is rotatably mounted through suitable supporting framework and central plug 21 to pump air through the nacelle and out an exhaust nozzle in the direction shown by the arrow as is well known.

In those cases, as shown in FIG. 2, where it is possible to mount the powerplant nacelle 17 adjacent the fuselage 10 and where no rotation is desired there is provided an enlongated common plenum chamber 22 that is disposed inside the fuselage and is generally parallel to the axis of fan rotation. This chamber is intended to take the exhaust gas from the remote gas generator and distribute it to the tip turbine fan by means to be described. With the tip turbine curise fan powerplant, the turbine buckets on the fan periphery are fed from a scroll means generally indicated at 23 disposed about the periphery of the fan between the walls 19 and 20 and oriented to direct gas to the tip turbine buckets to drive the fan in a well known manner. It is to be understood that the scroll may provide for radial inflow to the turbine buckets or, preferably in order to maintain smaller diameters, it may be disposed about the periphery as shown to direct gas axially through the turbine. This arrangement permits the scroll to be disposed completely between the walls in axial alignment with the turbine so that no extra diameter is required in the nacelle. In the instant invention, to maintain the thin nacelle structure, scroll means 23 is made up of a plurality of segmental sections 24 of discrete degrees of arc. The arcuate extent of the segment sections 24 will, of course, depend on the number of individual ducts that are required and whether complete or partial admission is desired. In the application shown, with twelve individual ducts for complete peripheral admission it will be seen that the segments each cover 30° of the periphery.

In order to direct the exhaust gas to the individual segments from elongated plenum chamber 22, a plurality of individual ducts 25 is connected at one end to the plenum and at the other end to each segment. By the arrangement shown in FIG. 2, the ducts extend between the walls in side-by-side relation from the common plenum at the side of the nacelle. It is convenient, for symmetry and maximum use of space, to connect the individual ducts 25 to the plenum 22 so that they extend oppositely by pairs that are axially spaced along the chamber as shown in FIG. 2. From the arrangement described, it can be seen that the ducts substantially spiral around the nacelle between the walls 19 and 20 with half going in opposite directions from the common plenum and directing gas to the individual segments in a symmetrical fashion. The individual segments 24 may be separate from each other or may be interconnected between adjacent segments as desired.

Referring to FIG. 3, it can be seen that the cross-sectional area of the nacelle 17 can be kept to a minimum by the side-by-side arrangement of the spiral ducts feeding the individual segments.

Referring next to FIG. 4, it may be desired to provide a rotatable nacelle 17 for VTOL or STOL application and, to this end, a generally circular plenum chamber 26 is provided at the side of nacelle 17 as disclosed in the copending application. In this rotatable arrangement the circular chamber 26 has an axial wall 27 extending at right angles to the elongation of the nacelle and the individual ducts 28 are connected around the periphery of the axial wall to radiate from this wall. Again, the arrangement is such that the individual segments 24 are connected to the plenum chamber 26 by the spiralling ducts 28 which may radiate and spiral in opposite directions around the nacelle to direct the gas to the segments in a symmetrical fashion. The FIG. 4 arrangement is merely another modification by which the individual nacelle walls 19 and 20 may be closely spaced as shown in FIG. 3 and rotation of the nacelle is permitted. The cross-sectional arrangement of FIG. 3 shows that the side-by-side arrangement of the ducts is the same as that of FIG. 2 where no rotation of the nacelle is desired.

It can be seen that the side-by-side arrangement of the small individual ducts between the nacelle walls and the individual discrete arcuate segments permits the nacelle to be thin and within desirable aerodynamic dimensions and still serve as the conduit for the large masses of exhaust gas fluid required in cruise fans.

While there have been described preferred forms of the invention, obvious modifications and variations are possible in light of the above teachings. It is therefore to be understood that within the scope of the appended claims, the invention may be practiced otherwise than as specifically described.

I claim:
1. A cruise fan powerplant comprising,
a barrel-like casing structure having inner and outer walls to form a hollow elongated nacelle,
a tip turbine fan rotatably mounted in the nacelle for movement of air therethrough to produce thrust,
scroll means disposed about the periphery of said fan between said walls and oriented to direct gas to the tip turbine to drive said fan,
said scroll containing a plurality of segmented sections of discrete degrees of arc,
individual ducts connected to each segment to direct gas to said segment,
said ducts extending between said walls side-by-side to a common plenum disposed at the side of said nacelle.
2. Apparatus as described in claim 1 wherein said ducts substantially spiral half in opposite directions from the common plenum and around said nacelle to direct gas to said segments symmetrically.
3. Apparatus as described in claim 1 wherein said common plenum includes a generally circular chamber at the side of said nacelle and said ducts are connected to said chamber to substantially radiate therefrom.
4. Apparatus as described in claim 1 wherein said common plenum includes an elongated chamber extending generally parallel to the axis of fan rotation at the nacelle side and said ducts are connected to said plenum in oppositely directed pairs axially spaced along said chamber.
5. Apparatus as described in claim 1 wherein said scroll means is disposed about the periphery of said fan to direct gas substantially axially to said turbine and the scroll segments are disposed between said walls in axial alignment with the turbine.

6. Apparatus as described in claim 3 wherein said circular chamber has an axial wall at right angles to the elongation of said nacelle and said ducts are connected to said axial wall to radiate therefrom and spiral half in opposite directions and around said nacelle to direct gas to said segments symmetrically.

7. Apparatus as described in claim 3 wherein said scroll means is disposed about the periphery of said fan to direct gas substantially axially to said turbine and the scroll segments are disposed between said walls in axial alignment with the turbine.

8. Apparatus as described in claim 4 wherein said scroll means is disposed about the periphery of said fan to direct gas substantially axially to said turbine and the scroll segments are disposed between said walls in axial alignment with the turbine.

References Cited by the Examiner
UNITED STATES PATENTS

| | | | |
|---|---|---|---|
| 2,518,660 | 8/1950 | Browne | 230—122 |
| 3,033,492 | 5/1962 | Rowe | 244—23 |

MARK NEWMAN, *Primary Examiner.*

D. HART, *Assistant Examiner.*